US009781080B2

(12) United States Patent
Liu et al.

(10) Patent No.: US 9,781,080 B2
(45) Date of Patent: Oct. 3, 2017

(54) METHOD AND APPARATUS FOR DIVERSE SECURITY HANDLING IN AN ENHANCED LOCAL AREA NETWORK

(71) Applicant: Nokia Technologies Oy, Espoo (FI)

(72) Inventors: Yang Liu, Beijing (CN); Da Jiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 225 days.

(21) Appl. No.: 14/779,258

(22) PCT Filed: Apr. 1, 2013

(86) PCT No.: PCT/CN2013/073570
§ 371 (c)(1),
(2) Date: Sep. 22, 2015

(87) PCT Pub. No.: WO2014/161138
PCT Pub. Date: Oct. 9, 2014

(65) Prior Publication Data
US 2016/0050186 A1 Feb. 18, 2016

(51) Int. Cl.
*H04L 29/06* (2006.01)
*G06F 21/00* (2013.01)
*H04W 12/02* (2009.01)

(52) U.S. Cl.
CPC .......... *H04L 63/0428* (2013.01); *H04L 63/18* (2013.01); *H04W 12/02* (2013.01)

(58) Field of Classification Search
CPC ..... H04L 63/0428; H04L 63/18; H04W 12/02
See application file for complete search history.

(56) References Cited

U.S. PATENT DOCUMENTS

| 2003/0021278 A1* | 1/2003 | Domschitz | H04Q 11/0428 370/395.2 |
| 2004/0047322 A1* | 3/2004 | O'Neill | H04L 12/4633 370/338 |
| 2005/0174984 A1* | 8/2005 | O'Neill | H04L 45/58 370/349 |

(Continued)

FOREIGN PATENT DOCUMENTS

| CN | 1191735 C | 3/2005 |
| CN | 101237682 A | 8/2008 |

(Continued)

OTHER PUBLICATIONS

"Preliminary Discussion on Inter-ENB Carrier Aggregation", 3GPP TSG-RAN WG2 Meeting #81, R2-130099, Agenda: 7.2, Samsung, Jan. 28-Feb. 1, 2013, pp. 1-5.

(Continued)

*Primary Examiner* — Lisa Lewis
(74) *Attorney, Agent, or Firm* — Nokia Technologies Oy

(57) ABSTRACT

A method for diverse security handling may comprise: maintaining a first connection between a user equipment and a first network node, and a second connection between the user equipment and a second network node which has a third connection with the first network node; setting an indicator in a packet to indicate whether a destination of user data in the packet is the first network node or the second network node; and transmitting the packet from the user equipment to the first network node via the first connection.

13 Claims, 4 Drawing Sheets

(56) References Cited

U.S. PATENT DOCUMENTS

| | | | | |
|---|---|---|---|---|
| 2009/0252110 | A1* | 10/2009 | Sridhara | H04L 1/1854 370/330 |
| 2009/0318124 | A1* | 12/2009 | Haughn | G06F 8/65 455/418 |
| 2010/0195665 | A1* | 8/2010 | Jackson | H04L 1/1607 370/464 |
| 2011/0080911 | A1* | 4/2011 | Guichard | H04L 45/02 370/392 |
| 2012/0148043 | A1* | 6/2012 | Tofighbakhsh | H04L 63/101 380/247 |
| 2012/0327937 | A1* | 12/2012 | Melman | H04L 69/18 370/392 |
| 2013/0272310 | A1* | 10/2013 | Suzuki | H04L 45/04 370/392 |
| 2013/0332617 | A1* | 12/2013 | Aoki | H04L 63/08 709/227 |
| 2015/0124590 | A1* | 5/2015 | Chu | H04L 45/22 370/225 |
| 2016/0156504 | A1* | 6/2016 | Wang | H04L 41/0695 370/217 |

FOREIGN PATENT DOCUMENTS

| | | |
|---|---|---|
| WO | 2006/114628 A2 | 11/2006 |
| WO | 2011/085069 A2 | 7/2011 |
| WO | 2011/121174 A1 | 10/2011 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.2.0, Dec. 2012, pp. 1-340.

"3rd Generation Partnership Project; Technical Specification Group Radio Access Network; Evolved Universal Terrestrial Radio Access (E-UTRA); Packet Data Convergence Protocol (PDCP) specification (Release 11)", 3GPP TS 36.323, V11.1.0, Dec. 2012, pp. 1-27.

"3rd Generation Partnership Project; Technical Specification Group Services and System Aspects; 3GPP System Architecture Evolution (SAE); Security architecture (Release 12)", 3GPP TS 33.401, V12.6.0, Dec. 2012, pp. 1-121.

"Security in the Evolved Packet System", Ericsson, Feb. 2010, 40 pages.

Extended European Search Report received for corresponding European Patent Application No. 13881172.4, dated Nov. 17, 2016, 7 pages.

"Discussion on Protocol Stack Support in Small Cell eNB", 3GPP TSG RAN WG2 Meeting #81, R2-130068, Agenda: 7.2, Research in Motion, Jan. 28-Feb. 1, 2013, 7 pages.

"IP Flow Mobility for Individual Flows of a Single PDN Connection", 3GPP TSG SA WG2 Meeting #69, TD S2-087607, Agenda: 7.10, NEC, Nov. 17-21, 2008, pp. 1-3.

International Search Report and Written Opinion received for corresponding Patent Cooperation Treaty Application No. PCT/CN2013/073570, dated Jan. 16, 2014, 10 pages.

* cited by examiner

METHOD AND APPARATUS FOR DIVERSE SECURITY HANDLING IN AN ENHANCED LOCAL AREA NETWORK

RELATED APPLICATION

This application was originally filed as Patent Cooperation Treaty Application No. PCT/CN2013/073570 filed Apr. 1, 2013.

FIELD OF THE INVENTION

The present invention generally relates to communication networks. More specifically, the invention relates to a method and apparatus for diverse security handling.

BACKGROUND

The modern communications era has brought about a tremendous expansion of communication networks. Wireless and mobile networking technologies have addressed related consumer demands, while providing more flexibility and immediacy of information transfer. For a communication system such as a hybrid network where an Access Point (AP) in a local small cell may provide local services for a User Equipment (UE) and be connected to a Core Network (CN) through backhaul of an evolved Node B (eNB), some concerns have been raised in a local area due to the limited control for the AP in the small cell. It is desirable to investigate a solution of diverse security handling in an enhanced Local Area Network (LAN).

SUMMARY

The present description introduces a solution of diverse security handling especially on User Plane (UP). With the proposed solution, a UE can indicate the UP property to an AP in a local small cell, and the AP may be able to decide whether to forward the UP traffic from the UE to an associated eNB or directly make it for local breakout.

According to a first aspect of the present invention, there is provided a method comprising: maintaining a first connection between a UE and a first network node, and a second connection between the UE and a second network node which has a third connection with the first network node; setting an indicator in a packet to indicate whether a destination of user data in the packet is the first network node or the second network node; and transmitting the packet from the UE to the first network node via the first connection.

According to a second aspect of the present invention, there is provided an apparatus comprising: at least one processor; and at least one memory comprising computer program code, the at least one memory and the computer program code configured to, with the at least one processor, cause the apparatus to perform at least the following: maintaining a first connection between the apparatus and a first network node, and a second connection between the apparatus and a second network node which has a third connection with the first network node; setting an indicator in a packet to indicate whether a destination of user data in the packet is the first network node or the second network node; and transmitting the packet from the apparatus to the first network node via the first connection.

According to a third aspect of the present invention, there is provided a computer program product comprising a computer-readable medium bearing computer program code embodied therein for use with a computer, the computer program code comprising: code for maintaining a first connection between a UE and a first network node, and a second connection between the UE and a second network node which has a third connection with the first network node; code for setting an indicator in a packet to indicate whether a destination of user data in the packet is the first network node or the second network node; and code for transmitting the packet from the UE to the first network node via the first connection.

According to a fourth aspect of the present invention, there is provided an apparatus comprising: maintaining means for maintaining a first connection between the apparatus and a first network node, and a second connection between the apparatus and a second network node which has a third connection with the first network node; setting means for setting an indicator in a packet to indicate whether a destination of user data in the packet is the first network node or the second network node; and transmitting means for transmitting the packet from the apparatus to the first network node via the first connection.

According to a fifth aspect of the present invention, there is provided a method comprising: maintaining a first connection between a first network node and a UE which has a second connection with a second network node, and a third connection between the first network node and the second network node; receiving a packet at the first network node from the UE via the first connection, wherein the packet comprises an indicator to indicate whether a destination of user data in the packet is the first network node or the second network node; and handling the packet based at least in part on the indicator.

According to a sixth aspect of the present invention, there is provided an apparatus comprising: at least one processor; and at least one memory comprising computer program code, the at least one memory and the computer program code configured to, with the at least one processor, cause the apparatus to perform at least the following: maintaining a first connection between the apparatus and a UE which has a second connection with another apparatus, and a third connection between the apparatus and the another apparatus; receiving a packet at the apparatus from the UE via the first connection, wherein the packet comprises an indicator to indicate whether a destination of user data in the packet is the apparatus or the another apparatus; and handling the packet based at least in part on the indicator.

According to a seventh aspect of the present invention, there is provided a computer program product comprising a computer-readable medium bearing computer program code embodied therein for use with a computer, the computer program code comprising: code for maintaining a first connection between a first network node and a UE which has a second connection with a second network node, and a third connection between the first network node and the second network node; code for receiving a packet at the first network node from the UE via the first connection, wherein the packet comprises an indicator to indicate whether a destination of user data in the packet is the first network node or the second network node; and code for handling the packet based at least in part on the indicator.

According to an eighth aspect of the present invention, there is provided an apparatus comprising: maintaining means for maintaining a first connection between the apparatus and a UE which has a second connection with another apparatus, and a third connection between the apparatus and the another apparatus; receiving means for receiving a packet at the apparatus from the UE via the first connection, wherein the packet comprises an indicator to indicate whether a destination of user data in the packet is the apparatus or the another apparatus; and handling means for handling the packet based at least in part on the indicator.

According to exemplary embodiments, the apparatus in the sixth/eighth aspect of the present invention may comprise a first network node, and the another apparatus in the sixth/eighth aspect of the present invention may comprise a second network node. For example, the first network node may comprise a local network node, and the second network node may comprise a macro network node. According to the fifth aspect to the eighth aspect of the present invention, said handling the packet based at least in part on the indicator may comprise: breaking out the packet at the first network node locally by deciphering the user data protected with a first key, if the indicator indicates that the destination of the user data is the first network node; and forwarding the packet to the second network node via the third connection without deciphering the user data protected with a second key, if the indicator indicates that the destination of the user data is the second network node.

According to an exemplary embodiment, the user data of which the destination is the first network node may be protected with a first key, and the user data of which the destination is the second network node may be protected with a second key independent from the first key. For example, the first key may be provided by the second network node. In accordance with an exemplary embodiment, the indicator may comprise a bit in a UP Packet Data Convergence Protocol (PDCP) packet. For example, the bit may comprise a reserved bit in the UP PDCP packet.

In exemplary embodiments of the present invention, the provided methods, apparatus, and computer program products can enable a local network node (such as an AP in a small cell) to recognize the nature of user data from a UE operating in a dual radio mode, and behave according to whether the user data is for a conventional Evolved Packet System (EPS) service or a local breakout service. For example, the local network node may use a key independent from that for a macro network node (such as an eNB in a macro cell) to derive the user data from the UE, which makes it possible to perform a secure local breakout for backhaul offloading.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

Figure 1:
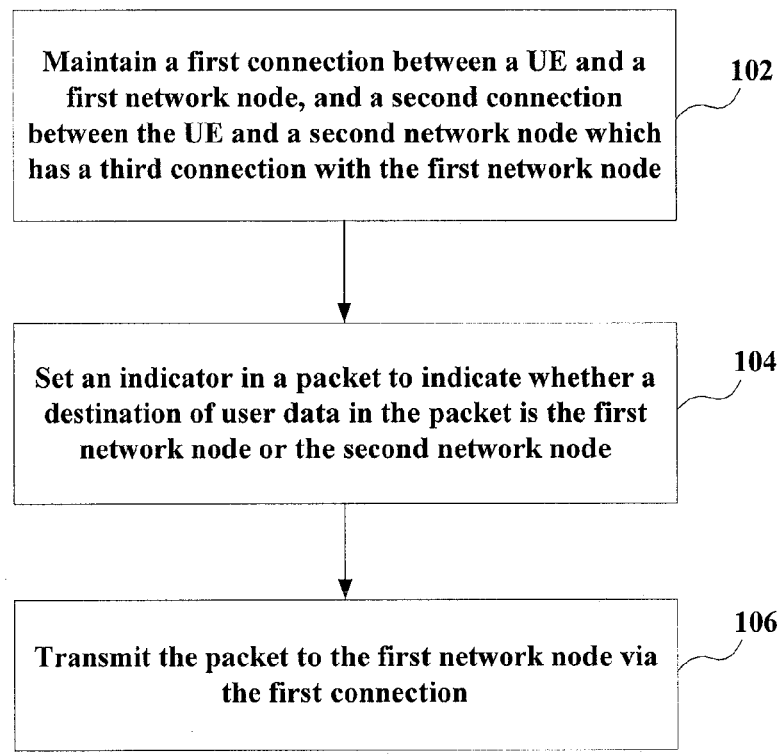
FIG. 1 is a flowchart illustrating a method for diverse security handling, which may be performed at a UE in accordance with embodiments of the present invention.

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Along with the development of radio communication networks such as Long Term Evolution (LTE) system, high-speed data services have been treated as one of the most important requirements. Especially for a LAN, higher data rate is expected from a user's perspective. How to provide services with high speed data rate has become a hot topic in 3GPP (3rd Generation Partnership Project). The Enhanced Local Area (ELA) concept is widely discussed and a new study item of Small Cell Enhancement (SCE) in higher layer is proposed in 3GPP.

Particularly, a UE supporting dual radio is one of the most important topics in the SCE item. For example, a local small cell may be deployed in a manner to be able to derive user data or not, thus it is possible that the local small cell may or may not be able to derive UP security keys. Considering the backhaul offloading issue, it is desirable that an AP in the local small cell could have a function of local breakout to relieve the backhaul burden from eNB to CN.

In some discussions with respect to the SCE item, one potential option is that a UE has dual connectivity to both a macro cell and a local small cell, considering local breakout is an important offloading solution to relieve an eNB's backhaul. However, since the macro cell and the local small cell may be both deployed by mobile operators and the local small cell may be able to derive UP user data for example by ciphering and deciphering the UP user data, it is essential to make the local small cell aware of the respective transmission paths for different UP user data and able to recognize whether the traffic from a UE is intended for an eNB/CN in the macro cell or for local breakout directly.

According to exemplary embodiments, a novel solution is proposed for diverse security handling especially on UP. In the proposed solution, when a UE is operating in a dual radio mode, the UE can indicate the property of the UP (such as a CN flow or a local breakout flow) with an indicator set in a traffic packet (for example in PDCP layer). As such, a local small cell or an AP may be able to decide whether to forward the traffic packet from the UE to an associated eNB or directly make it for local breakout. In an exemplary embodiment, the UE may be able to cipher user data with two independent keys (such as two different UP keys), one for the CN flow (such as a legacy CN flow or a CN flow via an AP) and the other for the local breakout flow. Thus, the AP may be allowed to use a respective independent key to derive UP data destined for it, while making the local breakout operation possible which is quite important for backhaul offloading. More details of the proposed solution will be illustrated hereinafter by way of example with reference to the accompanying drawings.

FIG. 1 is a flowchart illustrating a method for diverse security handling, which may be performed at a UE (such as a mobile station, a wireless terminal, a personal digital assistant (PDA), a portable device and the like) in accordance with embodiments of the present invention. The solution according to exemplary embodiments may be applicable to a communications network such as LTE-LAN, Local Area Evolution (LAE) and any other suitable hybrid network where a UE may operate in a dual radio mode. For example, a UE may maintain a first connection between the UE and a first network node, and a second connection between the UE and a second network node which has a third connection with the first network node, as shown in block 102. The first network node may comprise a local network node such as an AP/BS/control center and the like, and the second network node may comprise a macro network node such as an eNB/BS/control center and the like. The second connection may be more stable and more carefully managed so that the UE could not easily lose its connection with a macro network, while the first connection may be more suitable for providing high speed data services and some characteristic services in a local area. The third connection between the first network node and the second network node can enable the first network node to forward user data from the UE to the second network node and further to a CN. In an exemplary embodiment, the first network node (such as an AP in a small cell) may have a function of local breakout to relieve the backhaul burden from the second network node (such as an eNB in a macro cell) to the CN, and the first network node also can serve as an intermediate node to forward traffics from the UE to the second network node.

Figure 2:
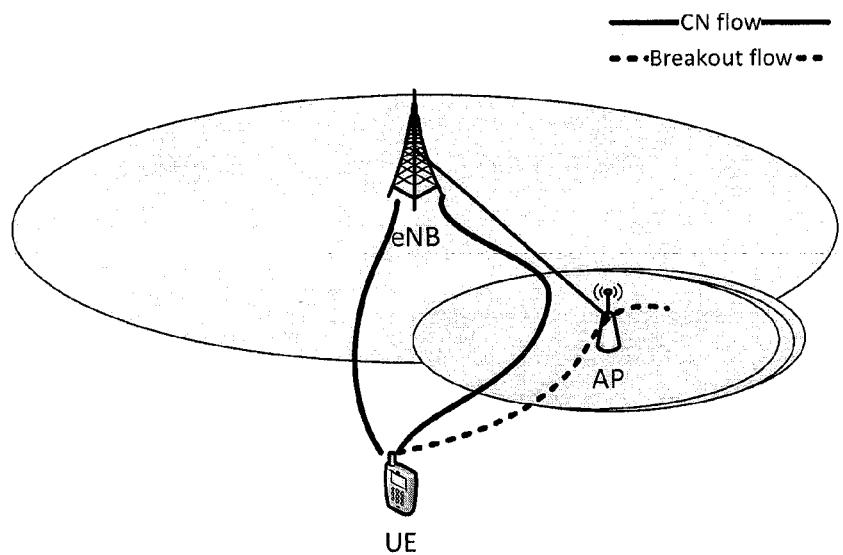
FIG. 2 shows an exemplary diverse data transmission in accordance with an embodiment of the present invention.

FIG. 2 shows an exemplary diverse data transmission in accordance with an embodiment of the present invention. In FIG. 2, a UE is operating in a dual radio mode in which one radio is between the UE and an eNB in a macro cell and the other radio is between the UE and an AP in a local small cell. As an intermediate node having a function of local breakout, the AP may be connected to a CN through backhaul of the eNB. The user data transmitted from the UE to the network side may have two different destinations comprising the eNB and the AP. Accordingly, traffic flows originated from the UE may comprise one breakout flow (denoted by a dash line in FIG. 2) and two CN flows (denoted by solid lines in FIG. 2). As shown in FIG. 2, the UE may transmit the user data in a CN flow through a conventional direct path to the CN for example utilizing a legacy S1 interface to the eNB (which also may be referred to as a direct CN flow), or through an indirect path to the CN for example via the AP and the associated eNB (which also may be referred to as an indirect CN flow). Alternatively or additionally, the breakout flow also may be utilized with a local breakout function in the AP, which can relieve the CN burden for large amounts of user data in a dense deployment scenario. It is noted that there is no limit on the utilization of the two radios, and the UE could transfer the user data to the eNB via the macro cell radio and/or the local small cell radio. When receiving traffics from the UE, the AP needs to distinguish the traffics (or UP flows) based at least in part on their different destinations, and decides whether the respective traffic is going to the eNB/CN, or going to break out locally. For the traffic (such as EPS traffic) going to the eNB/CN, the AP may be able to forward the traffic to the eNB and then to the CN.

Referring back to FIG. 1, the UE may set an indicator in a packet to indicate whether a destination of user data in the packet is the first network node or the second network node, as shown in block 104. In an exemplary embodiment, the user data of which the destination is the first network node may be protected with a first key (such as a UP key for a local small cell), and the user data of which the destination is the second network node may be protected with a second key (such as a UP key for a macro cell) independent from the first key. For example, the first key may be provided by the second network node such as an eNB or any other suitable macro network entity. In block 106, the UE may transmit the packet to the first network node via the first connection. According to exemplary embodiments, the user data in the packet from the UE may be ciphered with a corresponding UP key, while the indicator in the packet may not be ciphered so that the AP can recognize the indicator from the packet without deciphering the user data. For example, the indicator may comprise a bit (such as a reserved bit) in a UP PDCP packet.

Figure 3:
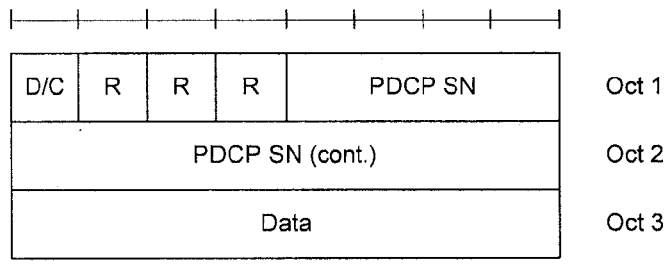
FIG. 3 shows an exemplary structure for a UP PDCP packet in accordance with an embodiment of the present invention.

FIG. 3 shows an exemplary structure for a UP PDCP packet in accordance with an embodiment of the present invention. As shown in FIG. 3, the exemplary structure may comprise three octets which are denoted as Oct 1, Oct 2 and Oct 3. The PDCP Sequence Number (SN) field may occupy Oct 2 and a part of Oct 1, and the data field may occupy Oct 3. Oct 1 may further comprise three reserved bits, which are shown as "R" in FIG. 3. In an exemplary embodiment, any one of the reserved bits in Oct1 could be used to indicate the destination or nature of user data from a UE. For example, a predetermined or randomly selected reserved bit may be set as "1" to indicate to an AP that the user data is for local breakout, and as "0" to indicate to the AP that the user data belongs to a CN flow and needs to be forwarded to an eNB and a CN associated to the AP. It will be realized that the indication of "0" or "1" is used here merely as an example, and other suitable numbers or symbols also can be used for the indicator to identify the destination or nature of the user data from the UE.

In an uplink direction, when the UE is about to cipher the user data (such as UP data), it may utilize appropriate UP keys to protect the user data. For example, the UP data intended for the AP may be ciphered with a first key (such as Kup*) for a local network and transmitted through a local breakout flow, and the UP data intended for the eNB may be ciphered with a second key (such as Kup) for a macro network and transmitted through a direct CN flow or an indirect CN flow. Considering that the local network could be under control of the macro network, Kup* may be provided by the macro network (for example by the eNB associated with the macro network) but independent from Kup. According to an exemplary embodiment, the ciphered part of a UP PDCP packet may be merely the data field in Oct 3, while Oct1 and Oct2 would not be ciphered so that Oct1 and Oct2 could be recognized without deciphering the user data. For example, when the AP receives a UP traffic packet from the UE in the uplink direction, since the reserved bit as an indicator of destination in this packet is visible to the AP, it is feasible that the AP can determine how to handle the UP traffic packet based at least in part on the indication bit in PDCP layer.

Figure 4:
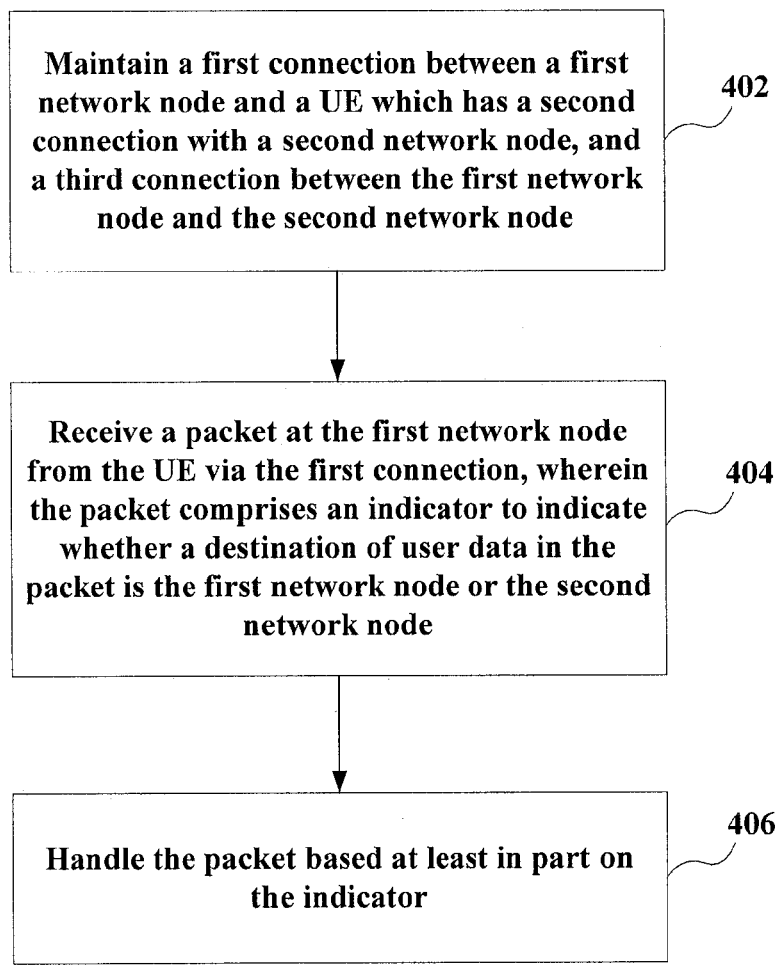
FIG. 4 is a flowchart illustrating a method for diverse security handling, which may be performed at a first network node in accordance with embodiments of the present invention.

FIG. 4 is a flowchart illustrating a method for diverse security handling, which may be performed at a first network node in accordance with embodiments of the present invention. Corresponding to the descriptions with respect to FIG. 1, in block 402, the first network node may maintain a first connection between the first network node and a UE which has a second connection with a second network node, and a third connection between the first network node and the second network node. As mentioned previously, the first network node may comprise a local network node such as an AP/BS/control center and the like, and the second network node may comprise a macro network node such as an eNB/BS/control center and the like. In block 404, a packet from the UE may be received at the first network node via the first connection, wherein the packet may comprise an indicator to indicate whether a destination of user data in the packet is the first network node or the second network node. In an exemplary embodiment, the indicator may comprise a bit (such as a reserved bit) in a UP PDCP packet, as illustrated in FIG. 3. Based at least in part on the indicator, the first network node may handle the packet received from the UE, as shown in block 406. According to exemplary embodiment, if the destination of the user data in the packet is the first network node, the first network node may break out the packet for example by deciphering the user data protected with a first key. If the destination of the user data in the packet is the second network node, the first network node may forward the packet to the second network node via the third connection without deciphering the user data protected with a second key. The second key (such as Kup* for a local network) may be independent from the first key (such as Kup for a macro network). Particularly, both the first and second keys may be provided by the second network node in a macro cell. Thus, the first network node in a local small cell may recognize the nature of UP data (for example, whether the UP data is for a conventional EPS service or a local breakout service) and perform separated or diverse security handling of the UP data from the UE.

Figure 5:
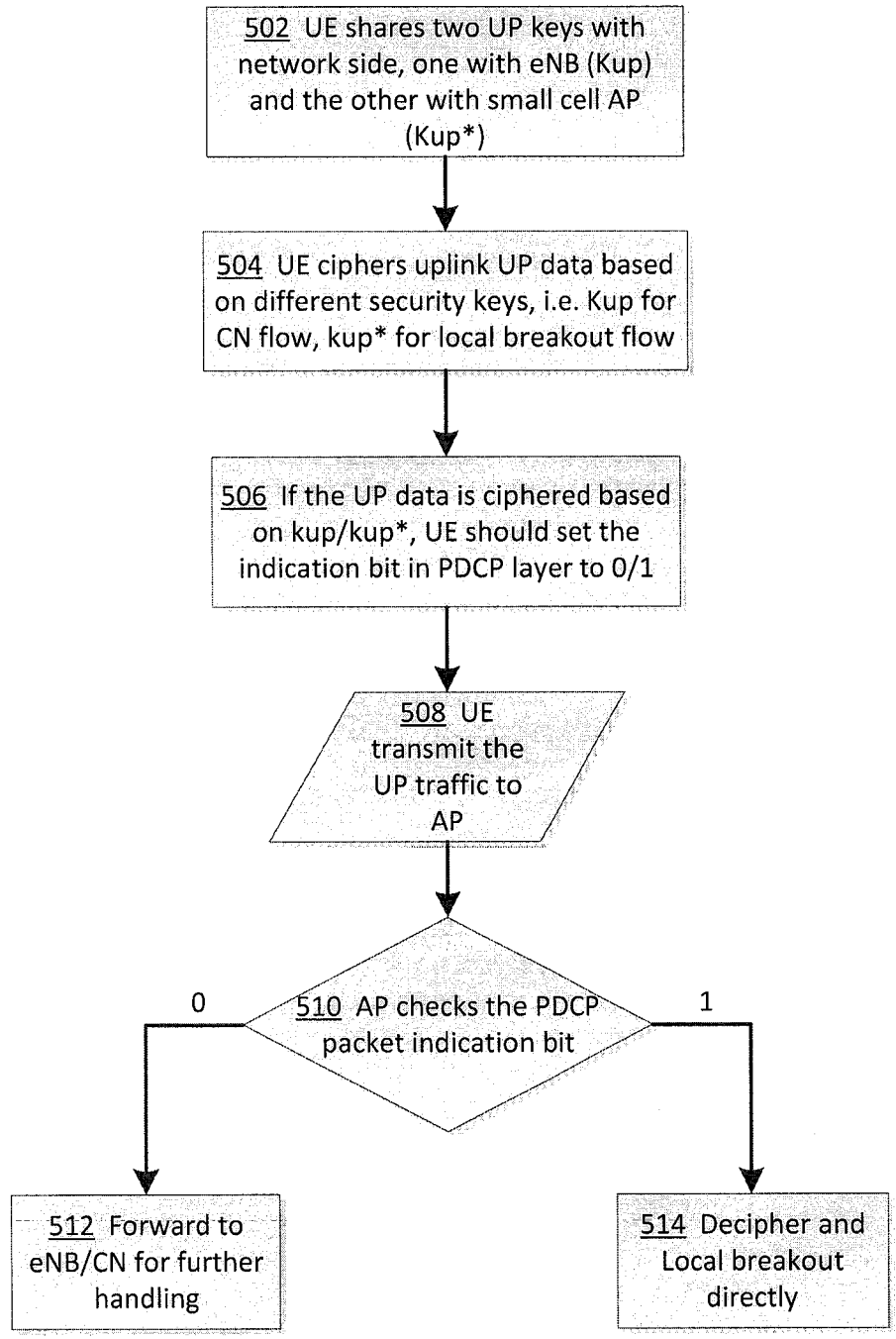
FIG. 5 exemplarily illustrates an uplink UP data transmission procedure in accordance with an embodiment of the present invention.

FIG. 5 exemplarily illustrates an uplink UP data transmission procedure in accordance with an embodiment of the present invention. As described with respect to FIGS. 1-4, a UE may share two UP keys with the network side, as shown in block 502, where a UP key (such as Kup) shared with an eNB in a macro cell may be used to protect the conventional EPS user data between the UE and the eNB through the direct CN flow or the indirect CN flow, and a UP key (such as Kup*) shared with an AP in a local small cell may be used to protect the local breakout user data between the UE and the AP. For example, the UE can cipher uplink UP data with different security keys, in which Kup may be used for the CN flow and Kup* may be used for the local breakout flow, as shown in block 504. If the UP data is ciphered by using Kup, the UE may set an indication bit in PDCP layer to "0" to indicate that the UP traffic is intended for the eNB, and if the UP data is ciphered by using Kup*, the UE may set an indication bit in PDCP layer to "1" to indicate that the UP traffic is intended for the AP, as shown in block 506. It will be appreciated that the indication bit in PDCP layer is not limited to the value of "0" or "1", and may be set to other specified numbers or symbols. Then the UE may transmit the UP traffic to the AP in block 508, and the AP can check the PDCP packet indication bit in block 510. If the indication bit is "0", then the procedure proceeds to block 512 where the AP forwards the UP traffic to the eNB/CN for further handling. If the indication bit is "1", then the procedure proceeds to block 514 where the AP makes the UP traffic for local breakout directly and deciphers the UP data by using Kup*. The reason for this separated/diverse security handling may be that some concerns have been raised in a local area due to limited control for an AP in a small cell. The AP thus may not be a fully trusted node from the mobile operator's point of view. In an exemplary embodiment, the UP key used at a local AP (such as Kup*) could be provided by a macro eNB but independent from the one used in a legacy system (such as Kup), so as to address the concerns above. Considering the compatibility and complexity of the UE, the legacy UP keys also can be used for the conventional EPS service or user data.

The various blocks shown in FIG. 1 and FIGS. 4-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Many advantages can be achieved by using the solution provided by the present invention. For example, a UE can indicate the natures of different UP traffics to an AP in a local area, and the AP could be able to recognize respective transmission paths for the UP traffics from the UE, determine whether the UP traffic is for a conventional EPS service or a local breakout service and behave accordingly. The proposed solution of diverse security handling also enable an eNB to provide the UE and the AP with an UP key which is independent from the one used for a CN flow. In this way, the conventional EPS user data between the UE and the eNB and the local breakout user data between the UE and the AP may be protected respectively by using different UP keys. Accordingly, the AP may be allowed to use its independent key to derive the UP data from the UE while making local breakout operations possible, which can relieve the CN burden for large amounts of user data in a dense deployment scenario and is quite important for backhaul offloading.

Figure 6:
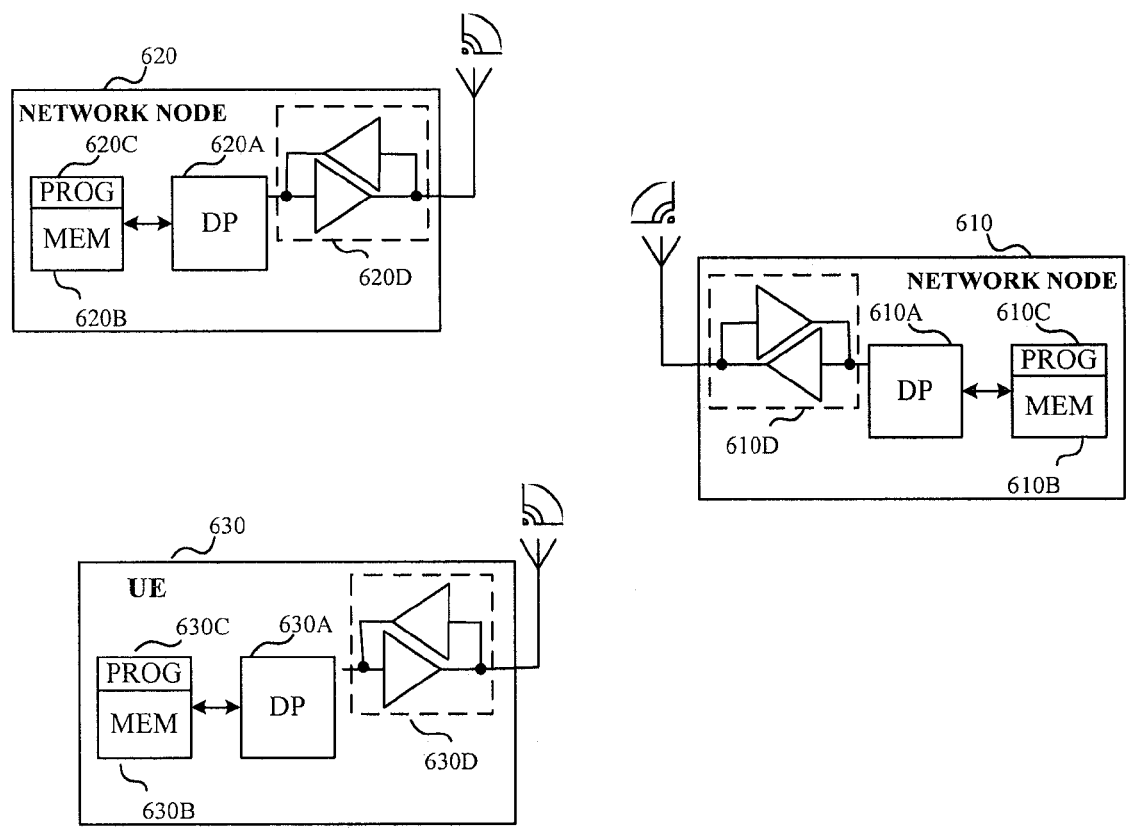
FIG. 6 is a simplified block diagram of various apparatuses which are suitable for use in practicing exemplary embodiments of the present invention.

FIG. 6 is a simplified block diagram of various apparatuses which are suitable for use in practicing exemplary embodiments of the present invention. In FIG. 6, a UE 630 (such as mobile phone, wireless terminal, portable device, PDA, multimedia tablet, and etc.) may be adapted for communicating with one or more network nodes such as a first network node 610 and a second network node 620. The first network node 610 (such as an AP/BS/control center, etc.) and the second network node 620 (such as an eNB/BS/control center, etc.) may be adapted for communicating with each other directly or through an intermediate entity (not shown in FIG. 6).

In an exemplary embodiment, the UE 630 may comprise at least one processor (such as a data processor (DP) 630A shown in FIG. 6), and at least one memory (such as a memory (MEM) 630B shown in FIG. 6) comprising computer program code (such as a program (PROG) 630C shown in FIG. 6). The at least one memory and the computer program code may be configured to, with the at least one processor, cause the UE 630 to perform operations and/or functions described in combination with FIGS. 1-5. In an exemplary embodiment, the UE 630 may optionally comprise a suitable transceiver 630D for communicating with an apparatus such as another UE, a network node, a server and so on. The first network node 610 may comprise at least one processor (such as a data processor (DP) 610A shown in FIG. 6), and at least one memory (such as a memory (MEM) 610B shown in FIG. 6) comprising computer program code (such as a program (PROG) 610C shown in FIG. 6). The at least one memory and the computer program code may be configured to, with the at least one processor, cause the first network node 610 to perform operations and/or functions described in combination with FIGS. 1-5. In an exemplary embodiment, the first network node 610 may optionally comprise a suitable transceiver 610D for communicating with an apparatus such as the second network node 620, a UE 630 or a network entity (not shown in FIG. 6). Similarly, the second network node 620 may comprise at least one processor (such as a data processor (DP) 620A shown in FIG. 6), and at least one memory (such as a memory (MEM) 620B shown in FIG. 6) comprising computer program code (such as a program (PROG) 620C shown in FIG. 6). The at least one memory and the computer program code may be configured to, with the at least one processor, cause the second network node 620 to perform operations and/or functions described in combination with FIGS. 1-5. In an exemplary embodiment, the second network node 620 may optionally comprise a suitable transceiver 620D for communicating with an apparatus such as the first network node 610, the UE 630 or a network entity (not shown in FIG. 6). For example, at least one of the transceivers 610D, 620D, 630D may be an integrated component for transmitting and/or receiving signals and messages. Alternatively, at least one of the transceivers 610D, 620D, 630D may comprise separate components to support transmitting and receiving signals/messages, respectively. The respective DPs 610A, 620A and 630A may be used for processing these signals and messages.

Alternatively or additionally, the first network node 610, the second network node 620 and the UE 630 may comprise various means and/or components for implementing functions of the foregoing steps and methods in FIG. 1 and FIGS. 4-5. For example, the UE 630 may comprise: maintaining means for maintaining a first connection between the UE and a first network node (such as the first network node 610), and a second connection between the UE and a second network node (such as the second network node 620) which has a third connection with the first network node; setting means for setting an indicator in a packet to indicate whether a destination of user data in the packet is the first network node or the second network node; and transmitting means for transmitting the packet from the UE to the first network node via the first connection. In an exemplary embodiment, the first network node 610 may comprise: maintaining means for maintaining a first connection between the first network node and a UE (such as the UE 630) which has a second connection with a second network node (such as the second network node 620), and a third connection between the first network node and the second network node; receiving means for receiving a packet at the first network node from the UE via the first connection, wherein the packet comprises an indicator to indicate whether a destination of user data in the packet is the first network node or the second network node; and handling means for handling the packet based at least in part on the indicator. For example, the handling means may comprises: breaking out means for breaking out the packet at the first network node locally by deciphering the user data protected with a first key, if the indicator indicates that the destination of the user data is the first network node; and forwarding means for forwarding the packet to the second network node via the third connection without deciphering the user data protected with a second key, if the indicator indicates that the destination of the user data is the second network node.

At least one of the PROGs 610C, 620C, 630C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 610A of the first network node 610, by the DP 620A of the second network node 620 and by the DP 630A of the UE 630, or by hardware, or by a combination of software and hardware.

The MEMs 610B, 620B and 630B may be of any type suitable to the local technical environment and may be implemented using any suitable data storage technology, such as semiconductor based memory devices, flash memory, magnetic memory devices and systems, optical memory devices and systems, fixed memory and removable memory. The DPs 610A, 620A and 630A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. An apparatus, comprising:
at least one processor; and
at least one memory comprising computer program code,
the at least one memory and the computer program code configured to, with the at least one processor, cause the apparatus to perform at least the following:
maintain a first connection between the apparatus and a first network node, and a second connection between the apparatus and a second network node which has a third connection with the first network node;
set an indicator in a packet to indicate whether a destination of user data in the packet is the first network node or the second network node, wherein the user data of which the destination is the first network node is protected with a first key, and the user data of which the destination is the second network node is protected with a second key independent from the first key, and wherein the first key is provided by the second network node; and
transmit the packet from the apparatus to the first network node via the first connection.

2. The apparatus according to claim 1, wherein the indicator comprises a bit in a user plane packet data convergence protocol packet.

3. The apparatus according to claim 2, wherein the bit comprises a reserved bit in the user plane packet data convergence protocol packet.

4. The apparatus according to claim 1, wherein the first network node comprises a local network node, and the second network node comprises a macro network node.

5. An apparatus, comprising:
at least one processor; and
at least one memory comprising computer program code,
the at least one memory and the computer program code configured to, with the at least one processor, cause the apparatus to perform at least the following:
maintain a first connection between the apparatus and a user equipment which has a second connection with another apparatus, and a third connection between the apparatus and the another apparatus;
receive a packet at the apparatus from the user equipment via the first connection, wherein the packet comprises an indicator to indicate whether a destination of user data in the packet is the apparatus or the another apparatus, wherein the user data of which the destination is the apparatus is protected with a first key, and the user data of which the destination is the another apparatus is protected with a second key independent from the first key, and wherein the first key is provided by the another apparatus; and
handle the packet based at least in part on the indicator.

6. The apparatus according to claim 5, wherein the indicator comprises a bit in a user plane packet data convergence protocol packet.

7. The apparatus according to claim 6, wherein the bit comprises a reserved bit in the user plane packet data convergence protocol packet.

8. The apparatus according to claim 5, wherein said handle the packet based at least in part on the indicator comprises: break out the packet at the apparatus locally by deciphering the user data protected with the first key, if the indicator indicates that the destination of the user data is the apparatus; and forward the packet to the another apparatus via the third connection without deciphering the user data protected with a second key, if the indicator indicates that the destination of the user data is the another apparatus.

9. The apparatus according to claim 5, wherein the apparatus comprises a local network node, and the another apparatus comprises a macro network node.

10. A computer program product comprising a non-transitory computer-readable medium bearing computer program code embodied therein for use with a computer, the computer program code comprising:
code for maintaining a first connection between a first network node and a user equipment which has a second connection with a second network node, and a third connection between the first network node and the second network node;
code for receiving a packet at the first network node from the user equipment via the first connection, wherein the packet comprises an indicator to indicate whether a destination of user data in the packet is the first network node or the second network node, wherein the user data of which the destination is the first network node is protected with a first key, and the user data of which the destination is the second network node is protected with a second key independent from the first key, and wherein the first key is provided by the second network node; and
code for handling the packet based at least in part on the indicator.

11. The computer program product according to claim 10, wherein said handling the packet based at least in part on the indicator comprises: breaking out the packet at the first network node locally by deciphering the user data protected with the first key, if the indicator indicates that the destination of the user data is the first network node; and forwarding the packet to the second network node via the third connection without deciphering the user data protected with a second key, if the indicator indicates that the destination of the user data is the second network node.

12. The computer program product according to claim 10, wherein the indicator comprises a bit in a user plane packet data convergence protocol packet.

13. The computer program product according to claim 12, wherein the bit comprises a reserved bit in the user plane packet data convergence protocol packet.

* * * * *